United States Patent
Souissi

Patent Number: 6,078,801
Date of Patent: Jun. 20, 2000

[54] METHOD AND APPARATUS FOR OPTIMIZED POST DETECTION FILTERING FOR SIMULCAST RECEIVERS

[75] Inventor: Slim Souissi, Fort Worth, Tex.

[73] Assignee: Motorola, Inc., Schaumburg, Ill.

[21] Appl. No.: 09/002,941

[22] Filed: Jan. 5, 1998

[51] Int. Cl.[7] .................................................. H04B 1/10
[52] U.S. Cl. ............................ 455/303; 455/306; 375/350
[58] Field of Search ................................ 455/61.6, 503, 455/303, 385, 306, 307, 254; 375/332, 333, 334, 347, 350

[56] References Cited

U.S. PATENT DOCUMENTS

| | | | |
|---|---|---|---|
| 4,177,430 | 12/1979 | Paul | 455/306 |
| 5,208,833 | 5/1993 | Erhart et al. | 375/20 |
| 5,418,815 | 5/1995 | Ishikawa et al. | 375/216 |
| 5,659,576 | 8/1997 | Critchlow et al. | 375/350 |
| 5,678,218 | 10/1997 | Daikoku | 455/306 |
| 5,930,296 | 7/1999 | Kot | 375/233 |

*Primary Examiner*—Dwayne D. Bost
*Assistant Examiner*—Tracy M. Legree
*Attorney, Agent, or Firm*—Pablo Meles; Charles W. Bethards

[57] ABSTRACT

A selective call receiver unit (100) having a post detection filtering system optimized for both simulcast delay spread and receiver sensitivity includes a receiver (20), a detector (30) for detecting a message and providing a detected signal, a first post detection filter (40) for filtering the detected signal and further being optimized for sensitivity providing a first filtered signal, and a second post detection filter (41) for filtering the detected signal and further being optimized for simulcast delay spread providing a second filtered signal. In addition, a combiner 45 is used for selectively combining the first filtered signal with the second filtered signal.

24 Claims, 6 Drawing Sheets

METHOD AND APPARATUS FOR OPTIMIZED POST DETECTION FILTERING FOR SIMULCAST RECEIVERS

FIELD OF THE INVENTION

This invention relates generally to a simulcast receiver systems, and more particularly to a method and apparatus for optimizing post detection filtering for receiver sensitivity and simulcast delay spread.

BACKGROUND OF THE INVENTION

Today's pagers typically use a discriminator based receiver in order to decode a simulcast received signal. A post detection filter operates on the demodulated output in order to filter noise and at the same time attenuate the simulcast distortion effects. A tradeoff is usually made by this post detection filter: A wide band filter optimizes simulcast performance at the expense of sensitivity performance while a narrow band filter optimizes sensitivity performance at the expense of simulcast performance. Simulcast systems are always designed to meet sensitivity and simulcast delay spread (SDS) performance criteria imposed by the pager. In current pager design, the receiver performance can be optimized toward sensitivity at the expense of delay spread performance or vice versa. When the pager is optimized toward delay spread performance, it is always less sensitive. This means that reliability drops in areas of low signal strength. When the pager is optimized toward sensitivity performance, delay spread performance is affected. This translates into a drop in reliability within delay spread areas. These problems are costly for a paging carrier company since they are typically solved by adding new expensive transmitter sites. Thus, a need exists for a post detection filtering scheme that optimizes both sensitivity and simulcast performance.

SUMMARY

A post detection filtering method for a selective call receiver optimized for both simulcast delay spread and receiver sensitivity comprises the steps of filtering a received signal using a filter optimized for sensitivity for providing a first filtered signal, filtering the received signal using a filter optimized for simulcast delay spread for providing a second filtered signal, and combining the first filtered signal with the second filtered signal.

In another embodiment in accordance with the present invention, a post detection filtering method comprises the step of measuring a received signal for a received signal strength indication measurement. If the received signal strength indication measurement is above a predefined threshold, then the received signal is filtered using a filter optimized for simulcast delay spread. If the received signal strength indication measurement is below a predefined threshold, then the received signal is filtered using a filter optimized for sensitivity.

In yet another embodiment of the present invention, a post detection filtering system comprises a first post detection filter for filtering a received signal and optimized for sensitivity providing a first filtered signal, a second post detection filter for filtering the received signal and optimized for simulcast delay spread providing a second filtered signal, and a combiner for selectively combining the first filtered signal with the second filtered signal.

In an alternative embodiment of the present invention, a post detection filtering system comprises a memory for storing a received signal and a programmable post detection filter programmed for filtering the received signal optimized for sensitivity to provide a first filtered signal and further programmed for filtering the received signal optimized for simulcast delay spread to provide a second filtered signal. In addition, the post detection filtering system comprises a combiner for selectively combining the first filtered signal with the second filtered signal.

In yet another embodiment of the present invention, a selective call receiver having a programmable post detection filtering system optimized for both simulcast delay spread and receiver sensitivity comprises a receiver for receiving a transmitted signal and providing a received signal, a detector for detecting a message from the received signal providing a detected signal and a programmable post detection filter selectively programmed to filter the detected signal optimized for sensitivity or to filter the detected signal optimized for simulcast delay spread.

DETAILED DESCRIPTION OF THE INVENTION

Figure 1:
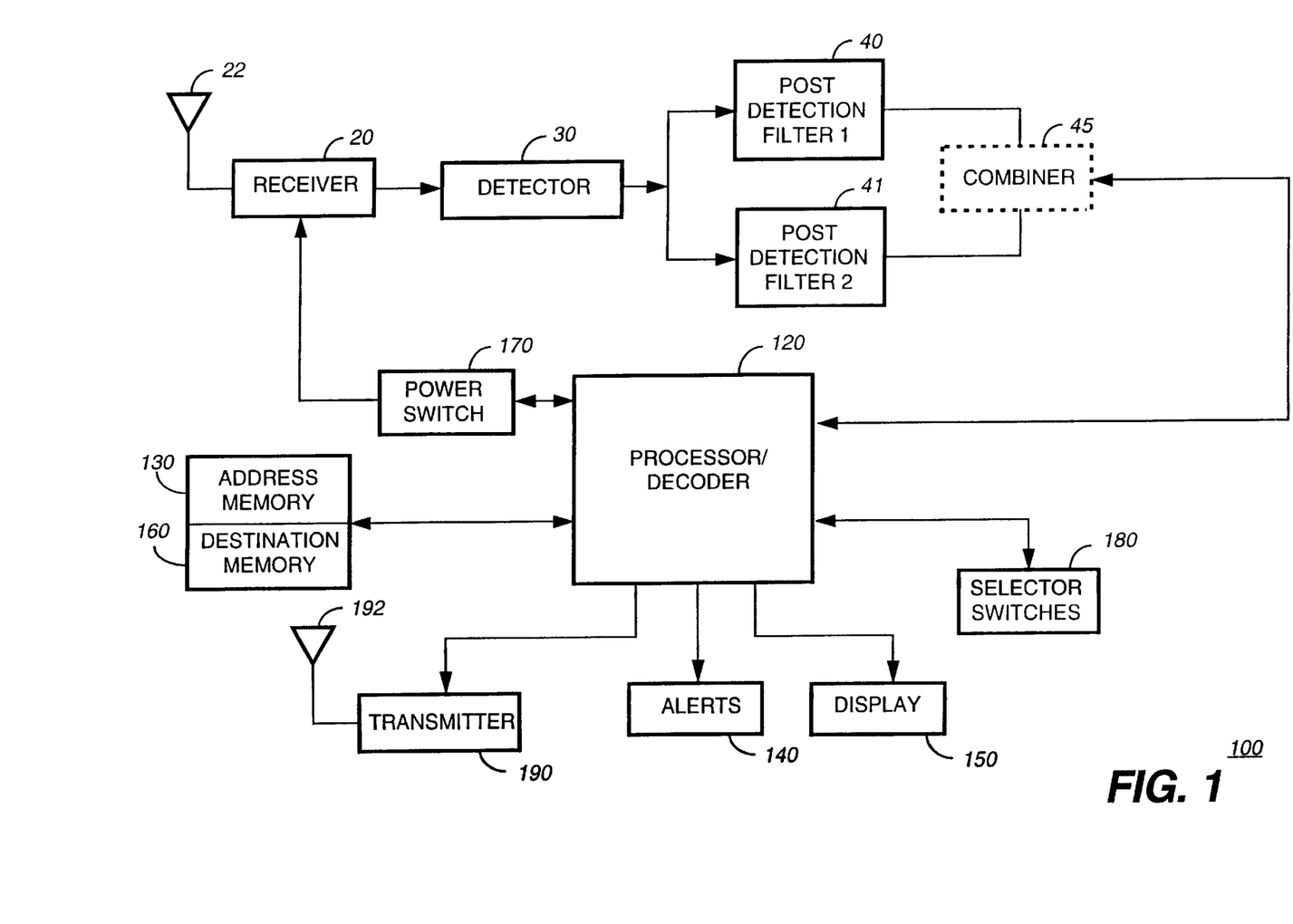
FIG. 1 is a block diagram of a selective call receiver having a post detection filter system in accordance with the present invention.

FIG. 1 illustrates a selective call receiver (or transceiver) unit (such as a pager) 100 utilizing a post detection filtering system (40, 41, and 45) in accordance with the present invention. The selective call receiver 100 comprises a receiver 20 for receiving RF signals detected by antenna 22. The received signal output by the receiver 20 is connected to a detector 30 which can take the form of a demodulator or discriminator. The detector 30 outputs the detected signal to a first post detection filter 40 optimized for receiver sensitivity and to a second post detection filter 41 optimized for simulcast delay spread. If errors are detected in the output of each of the filters 40 and 41, then the outputs are combined in a combiner 45 which ultimately outputs a filtered detected signal to a controller or processor 120 which may include a decoder function and other functions (such as a symbol slicer and synchronizer) which aides in decoding the digital data in accordance with protocol rules established for example, by Motorola's FLEX™ paging protocol technology. For example, the decoder outputs corresponding address information, message information and/or control information. The controller 120 functioning as the decoder is the control point for the selective call receiver 100. The controller 120 compares received address information with predetermined addresses stored in the address memory 130 in order to trigger one of the alerts 140 or to display a received text or graphics message on display 150. In addition, messages are stored in a destination memory 160. The controller 120 also is connected to a power switch 170 to shut down the receiver 20 during periods of time when the particular selective call receiver is not expected to receive information. A user interface to the selective call receiver 100 is achieved through selector switches 180. The selective call receiver may also have acknowledge-back or reverse channel transmitting capability, and accordingly may comprise a transmitter 190 and a transmitting antenna 192. The post detection filtering system described above in summary preferably comprises a first post detection filter 40 for filtering a received signal and optimized for sensitivity providing a first filtered signal and a second post detection filter 41 for filtering the received signal and optimized for simulcast delay spread providing a second filtered signal. Preferably, the first post detection filter is optimized for sensitivity using a narrow filter having coefficients optimized for sensitivity and the second post detection filter is optimized for simulcast delay spread using a wide filter having coefficients optimized for simulcast delay spread. Then, the post detection filtering system uses a combiner 45 for selectively combining the first filtered signal with the second filtered signal. Preferably, the combiner further comprises logic circuitry to determine if errors exists in both the first filtered signal and the second filtered signal. Otherwise, such logic circuitry could reside within the processor 120. In addition, the combiner preferably only combines the first filtered signal and the second filtered signal if errors were found in both the first filtered signal and the second filtered signal.

A message received by the selective call receiver 100 is essentially processed simultaneously by two different filters. The two messages retrieved from each branch are preferably checked by the cyclical redundancy check (CRC) code for the presence of an error. If at least one of the messages is correct than the decoding is declared successful and the message is displayed. If both messages are declared in error, the combiner 45 is activated. Code-word combining or bit combining may be used to reconstruct a new message. The newly reconstructed message will be checked for the presence of errors and will be displayed only if it is error free.

Figure 2:
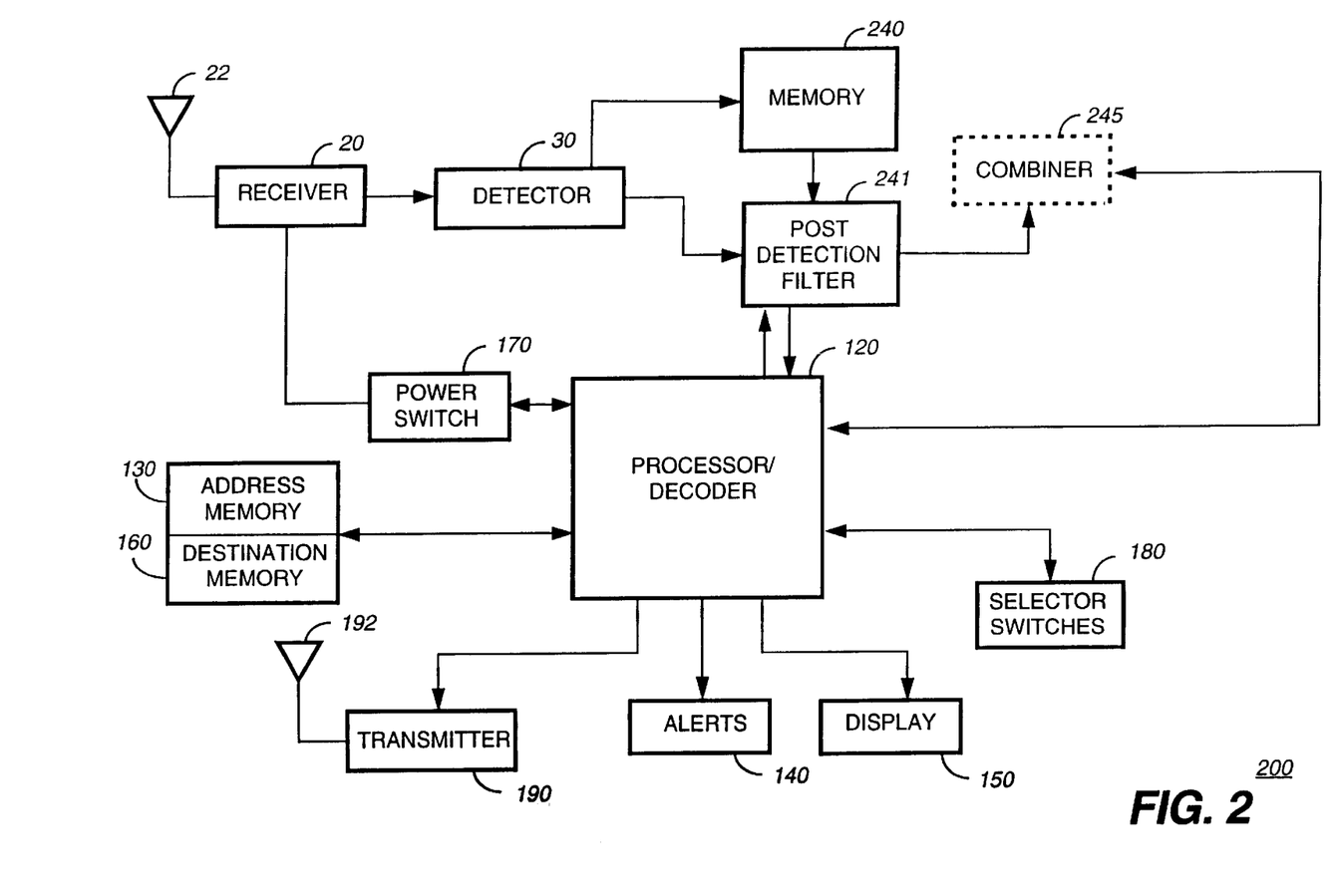
FIG. 2 is a block diagram of a selective call receiver having another post detection filter system in accordance with the present invention.

Referring to FIG. 2, another selective call receiver unit or transceiver unit 200 is shown similar to the unit 100 of FIG. 1 in accordance with the present invention. Like the unit 100, the unit 200 comprises an antenna 22 coupled to a receiver 20 which is coupled to a detector 30. The unit 200 also comprises a power switch 170, address memory 130, destination memory 160, selector switches 180, alerts 140, and a display 150 as previously described. The unit 200 may also include an antenna 192 and corresponding transmitter 190. Unlike the unit 100, unit 200 comprises a post detection filtering system that has a memory 240 for storing a received signal and a programmable post detection filter 241 programmed for filtering the received signal optimized for sensitivity to provide a first filtered signal and further programmed for filtering the received signal optimized for simulcast delay spread to provide a second filtered signal. The post detection filtering system here includes a combiner 245 for selectively combining the first filtered signal with the second filtered signal. As with the post detection filtering system of the unit 100, the programmable post detection filter 241 is preferably optimized for sensitivity and optimized for simulcast delay spread by adjusting a set of coefficients in the programmable post detection filter.

A pager incorporating this invention preferably takes the received audio waveform at the output of the discriminator and saves a copy in memory 240 such as RAM memory. It is processed twice. A first processing is performed on the message with a post detection filter that is optimized toward sensitivity. For the second processing, the coefficients of the post detection filter are adjusted to optimize the filter toward delay spread. The two messages obtained by the two processes are processed by a combiner in a way similar to the selective call receiver unit 100.

Figure 3:
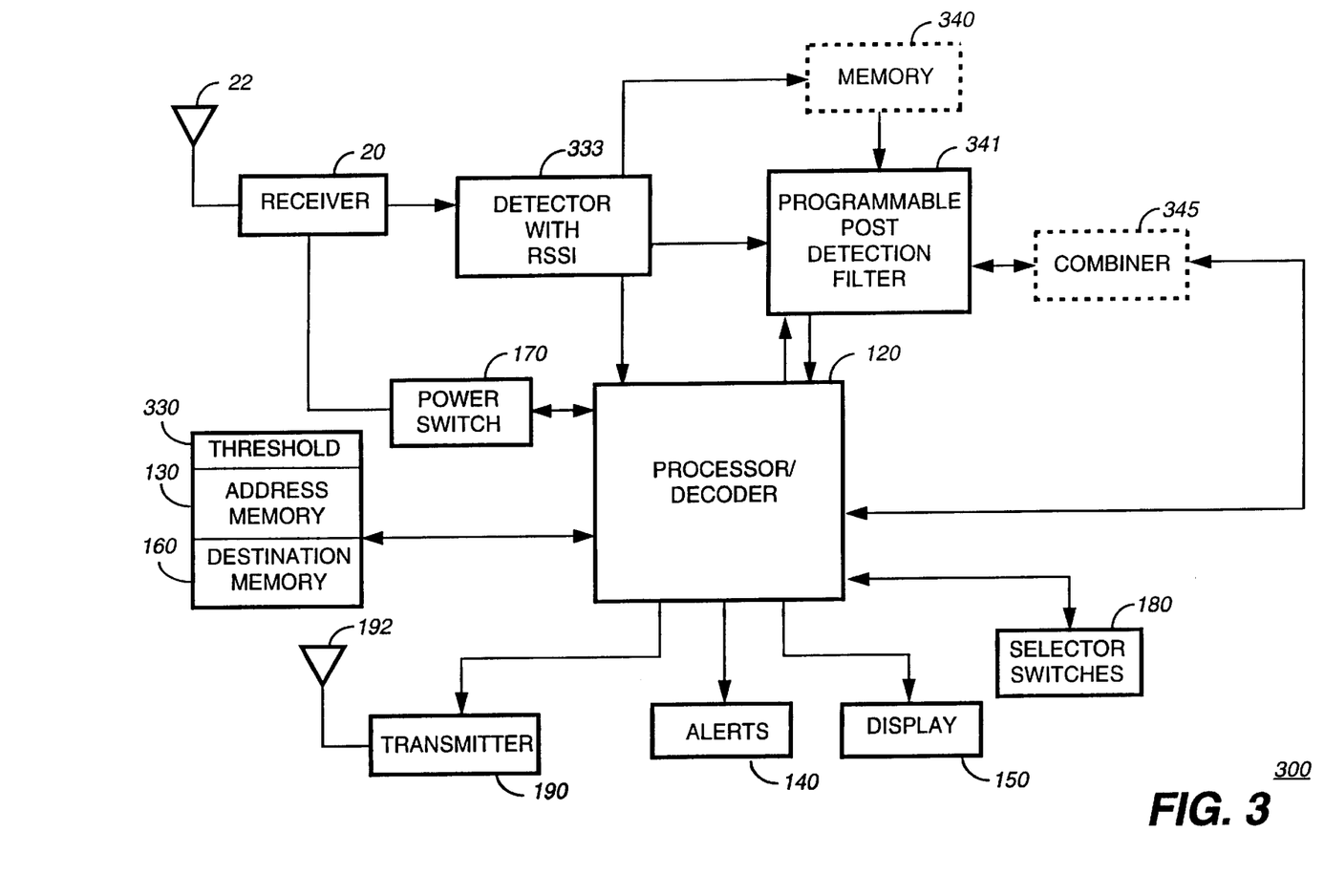
FIG. 3 is a block diagram of a selective call receiver having yet another post detection filter system in accordance with the present invention.

Referring to FIG. 3, another selective call receiver unit or transceiver unit 300 is shown similar to the unit 100 of FIG. 1 in accordance with the present invention. Like the unit 100, the unit 300 comprises an antenna 22 coupled to a receiver 20. The unit 300 also comprises a power switch 170, address memory 130, destination memory 160, selector switches 180, alerts 140, and a display 150 as previously described. The unit 300 may also include an antenna 192 and corresponding transmitter 190. Unlike the unit 100, unit 300 comprises a post detection filtering system may have an optional memory 340 for storing a received signal and a programmable post detection filter 341 programmed for filtering the received signal optimized for sensitivity to provide a first filtered signal and further programmed for filtering the received signal optimized for simulcast delay spread to provide a second filtered signal. The post detection filtering system here includes a combiner 345 for selectively combining the first filtered signal with the second filtered signal. As with the post detection filtering system of the unit 100, the programmable post detection filter 341 is preferably optimized for sensitivity and optimized for simulcast delay spread by adjusting a set of coefficients in the programmable post detection filter.

In the selective call receiver unit 300, the receiver 20 receives a transmitted signal and provides a received signal to a detector 333 which preferably includes a received signal strength indicator (RSSI). It should be understood that the RSSI does not necessarily need to be part of the detector, but may be a stand alone unit or incorporated in the receiver 20 as well. The received signal strength indicator provides a measurement of the received signal power, wherein a programmable post detection filter 341 filters the detected signal optimized for simulcast delay spread if the measurement of received signal power is above a predetermined threshold and the programmable post detection filter 341 filters the detected signal optimized for sensitivity if the measurement of the received signal power is below the predetermined threshold. The detector 333 detects a message from the received signal providing a detected signal. Thus, the programmable post detection filter 341 coupled to the detector 333 selectively filters the detected signal optimized for sensitivity or filters the detected signal optimized for simulcast delay. As before, the programmable post detection filter is optimized for sensitivity and optimized for simulcast delay spread by adjusting a set of coefficients in the programmable post detection filter.

Preferably, a selective call receiver using Motorola's FLEX protocol would measure the received signal power during the SYNC portion of a FLEX frame. If the power is above a predefined threshold (e.g at least having a Sensitivity +3 dB), then the pager decides to trade sensitivity for delay spread. The threshold value for sensitivity is preferably store in a memory such as memory location 330. The post detection filter coefficients are therefore optimized for delay spread. If the signal strength is close to sensitivity then the pager decides to optimize the post detection filter coefficients toward sensitivity. In either case the overall pager performance is optimized.

A series of equations and algorithms used in the controller 120 or programmable post detection filters 241 or 341 above can be implemented in many ways, such as by hardware circuits, a digital signal processor, computer software, microprocessor instructions, etc. However, those ordinarily skilled in the art will appreciate that other methods, in addition to those mentioned, are equally suitable. All of the circuits shown as part of the post detection filtering system can be integrated onto a single application specific integrated circuit (ASIC), together with other signal processing functionalities if desired.

Figure 4:
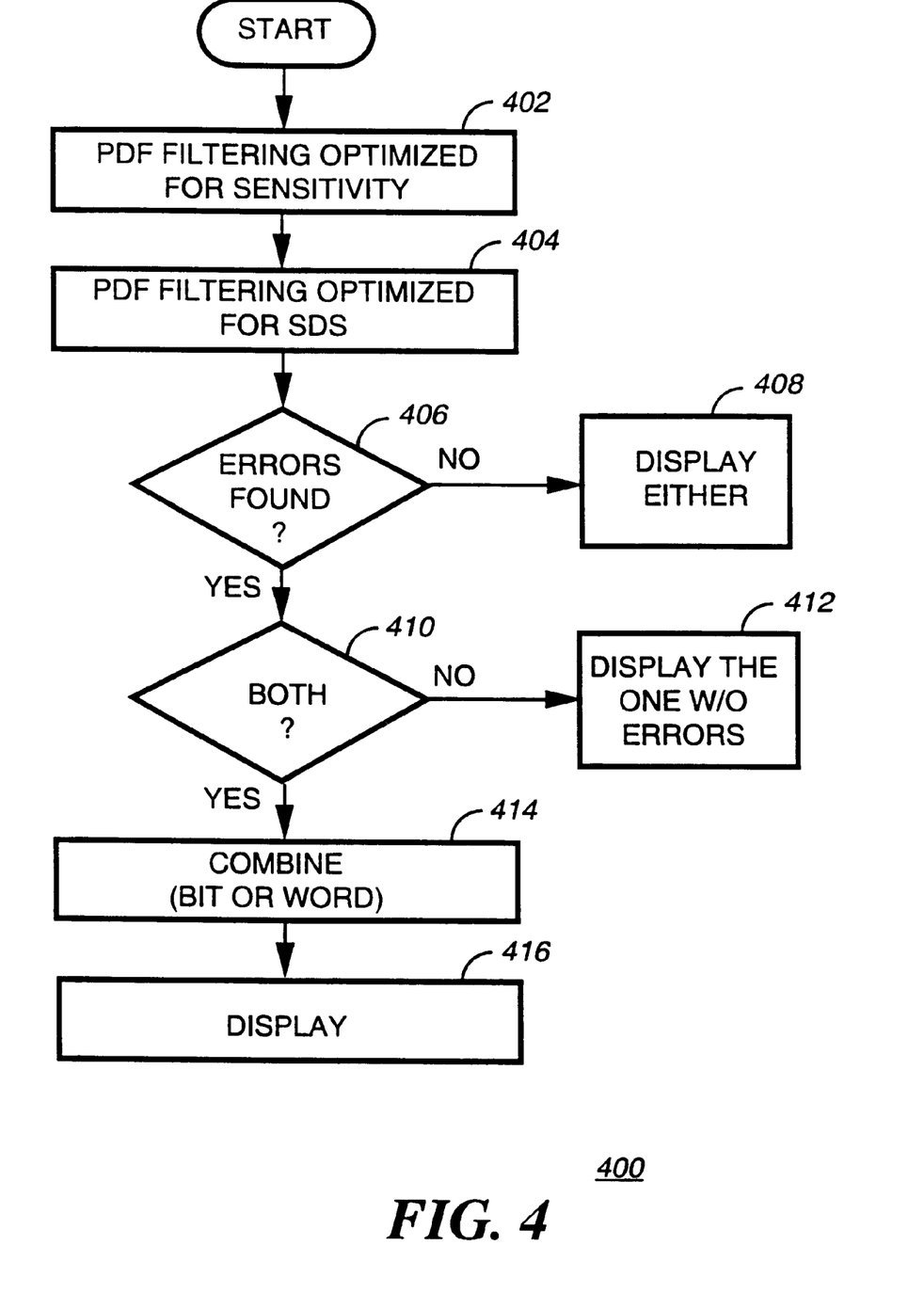
FIG. 4 is a flow chart illustrating a method of post detection filtering in accordance with the present invention.

Referring to FIG. 4, a flow chart is shown illustrating a post detection filtering method 400 in accordance with the present invention. Preferably, the post detection filtering method is preferably used in a selective call receiver that is optimized for both simulcast delay spread and receiver sensitivity. The method 400 preferably includes a step 402 of filtering a received signal using a filter optimized for sensitivity for providing a first filtered signal and a step 404 of filtering the received signal using a filter optimized for simulcast delay spread for providing a second filtered signal. Then, the method at decision block 406 would determine if errors exists in both the first filtered signal and the second filtered signal. If no errors were found in either the first or second filtered signal, then either the message contained in the first or second filtered signal can be displayed at step 408. If errors are found in either of the filtered signals, then it should be determined if errors were found in both filtered signals at decision block 410. If no errors were found in one of the filtered signals, then the message contained in the first or second filtered signal having no errors can be displayed at step 412 without combining the filtered signals. If errors were found in both filtered signals at decision block 410, then the method proceeds to the step 414 of combining the first filtered signal with the second filtered signal. Combining could mean for example code word combining or bit combining the first filtered signal with the second filtered signal to reconstruct an error free message. Of course, other means of combining known to those skilled in the art would be contemplated within the scope and spirit of the claims herein. Finally, the combined signal can be displayed at step 416.

As described in FIG. 1, the steps of filtering could further comprise the steps of using two different filters wherein the first filter optimized for sensitivity is a narrow filter having coefficients optimized for sensitivity and the second filter optimized for simulcast delay spread is a wide filter having coefficients optimized for simulcast delay spread.

Figure 5:
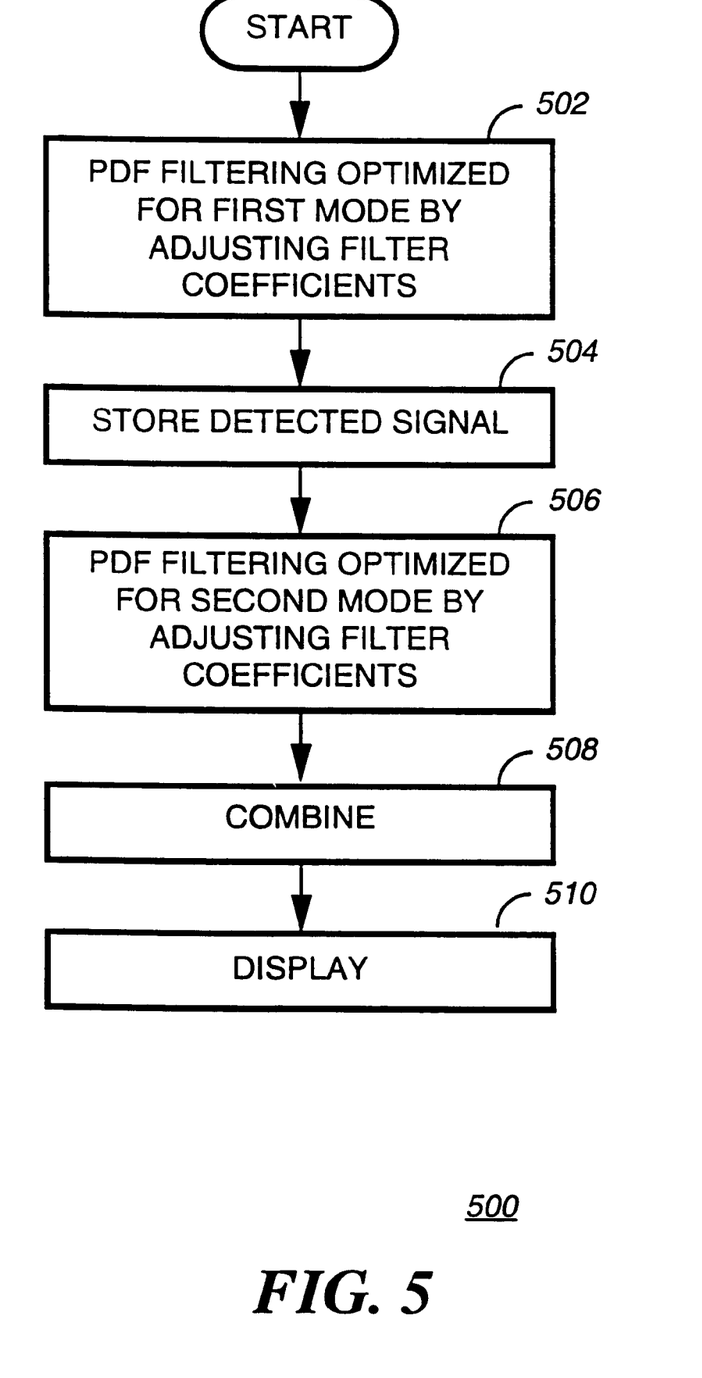
FIG. 5 is a flow chart illustrating a method of post detection filtering in accordance with another embodiment of the present invention.

Referring to FIG. 5, a flow chart is shown illustrating an alternative method 500 of post detection filtering in accordance with the present invention. At step 502, post detection filtering is performed in a first mode that is optimized for either simulcast delay distortion or receiver sensitivity preferably by adjusting filter coefficients. The resultant received signal obtained from the first mode filtering is then stored in a memory at step 504. Next, at step 506, post detection filtering is performed in a second mode that is optimized for either simulcast delay distortion or receiver sensitivity (whichever was not used in the first mode) preferably by again adjusting filter coefficients. The filtered signals are then combined at step 508 and then displayed at step 510. Preferably, the steps 502 and 506 of filtering are done using a single filter to process the received signal twice, first processing with the received signal with the filter optimized for sensitivity and then processing the received signal with the filter optimized for simulcast delay spread by adjusting a set of coefficients in the filter. Of course, the processing may also be done in the reverse order as well, where the filter is first optimized for SDS and then for sensitivity.

Figure 6:
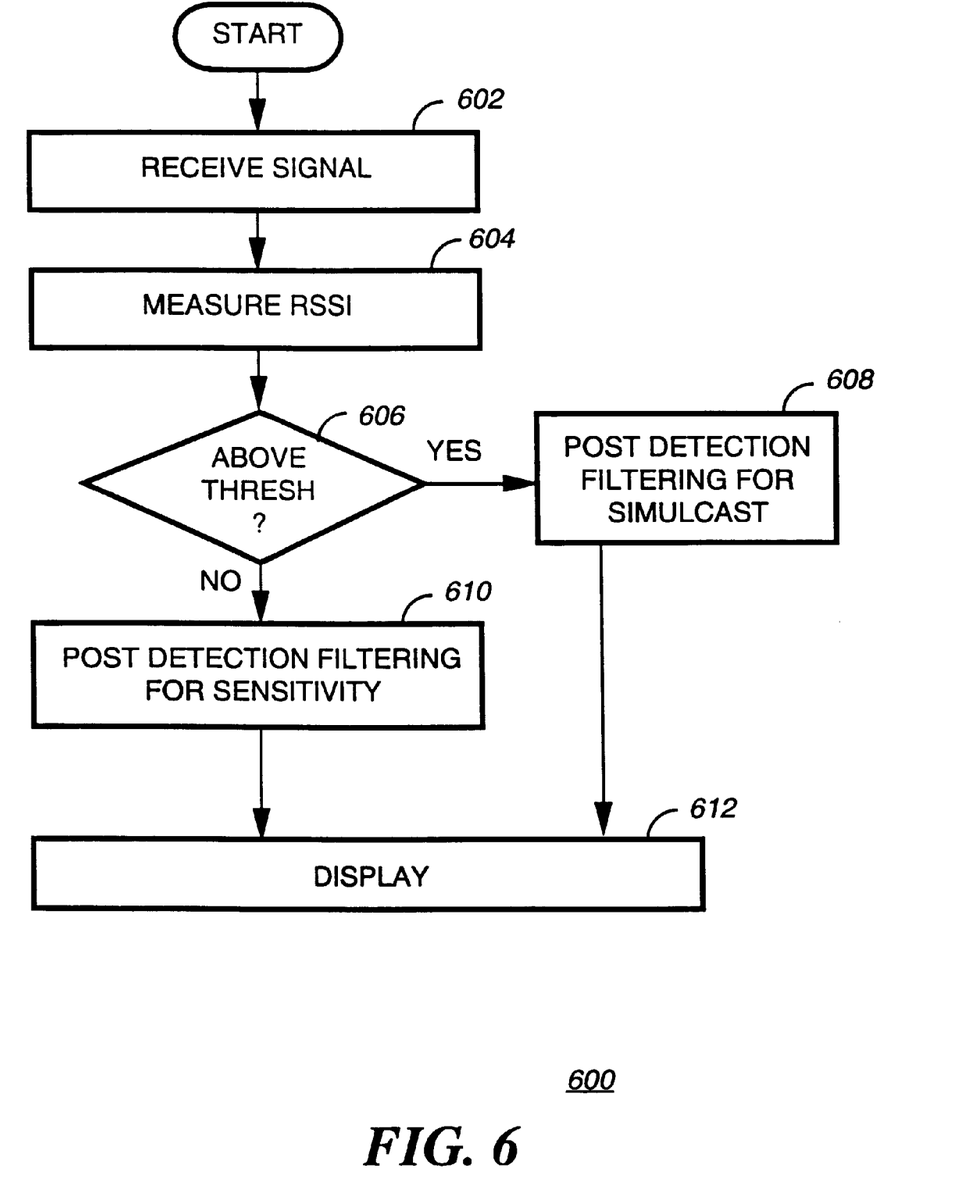
FIG. 6 is a flow chart illustrating a method of post detection filtering in accordance with yet another embodiment of the present invention

Referring to FIG. 6, a flow chart is shown illustrating yet another method 600 of post detection filtering in accordance with the present invention. At step 602, the signal is received. At step 604, the received signal is measured for a received signal strength indication measurement. Preferably, if signal being received uses a synchronous protocol such as Motorola's paging protocol, then the step of measuring the RSSI is done during a synchronization portion of a frame of a paging protocol. At decision block 606, if the received signal strength indication measurement is above a predefined threshold, then a filter is used at step 608 that is optimized for simulcast delay spread. If the received signal strength indication measurement at decision block 606 is below a predefined threshold, then a filter is used at step 610 that is optimized for sensitivity. Preferably, within decision block 606, a predefined threshold is set at least +3dB above sensitivity.

The description of the present invention illustrate apparatus and methods of receiver implementation that disassociates the receiver sensitivity performance from the delay spread performance. The present invention has been described in detail in connection with the disclosed embodiments, but these embodiments, however, are merely examples and the invention is not restricted thereto. It will be understood by those skilled in the art that variations and modifications can be made within the scope and spirit of the present invention as defined by the appended claims.

What is claimed is:

1. A post detection filtering method for a selective call receiver optimized for both simulcast delay spread and receiver sensitivity, the method comprising the steps of:

filtering a received signal using a filter optimized for sensitivity for providing a first filtered signal;

filtering the received signal using a filter optimized for simulcast delay spread for providing a second filtered signal; and combining the first filtered signal with the second filtered signal.

2. The method of claim 1, wherein the method further comprises the step of determining if errors exists in both the first filtered signal and the second filtered signal.

3. The method of claim 2, wherein the step of combining is only performed if errors were found in both the first filtered signal and the second filtered signal in the step of determining.

4. The method of claim 1, wherein the method further comprises the steps of checking for errors in the first filtered signal and in the second filtered signal and outputting a message from either the first filtered signal or the second filtered signal having no errors without combining the first filtered signal with the second filtered signal.

5. The method of claim 1, wherein the steps of filtering further comprise the steps of using two different filters wherein the first filter optimized for sensitivity is a narrow filter having coefficients optimized for sensitivity and the second filter optimized for simulcast delay spread is a wide filter having coefficients optimized for simulcast delay spread.

6. The method of claim 1, wherein the step of combining further comprises the step of code word combining the first filtered signal with the second filtered signal to reconstruct an error free message.

7. The method of claim 1, wherein the step of combining further comprises the step of bit combining the first filtered signal with the second filtered signal to reconstruct an error free message.

8. The method of claim 1, wherein the method further comprises the step of storing the received signal in a memory and wherein the steps of filtering further comprises the steps of using a single filter to process the received signal twice, first processing with the received signal with the filter optimized for sensitivity and then processing the received signal with the filter optimized for simulcast delay spread by adjusting a set of coefficients in the filter.

9. A post detection filtering method for a selective call receiver optimized for both simulcast delay spread and receiver sensitivity, the method comprising the steps of:

measuring a received signal for a received signal strength indication measurement;

if the received signal strength indication measurement is above a predefined threshold, then filtering the received signal using a filter optimized for simulcast delay spread; and if the received signal strength indication measurement is below a predefined threshold, then filtering the received signal using a filter optimized for sensitivity.

10. The method of claim 9, wherein the method further comprises the step of setting the predefined threshold at least +3dB above sensitivity.

11. The method of claim 9, wherein the step of measuring a received signal further comprises the steps of measuring received signal indication measurement during a synchronization portion of a frame of a paging protocol.

12. A post detection filtering system for a selective call receiver optimized for both simulcast delay spread and receiver sensitivity, the post detection filtering system comprises:

a first post detection filter for filtering a received signal and optimized for sensitivity providing a first filtered signal;

a second post detection filter for filtering the received signal and optimized for simulcast delay spread providing a second filtered signal; and a combiner for selectively combining the first filtered signal with the second filtered signal.

13. The post detection filtering system of claim 12, wherein the combiner further comprises logic circuitry to determine if errors exists in both the first filtered signal and the second filtered signal.

14. The post detection filtering system of claim 13, wherein the combiner only combines the first filtered signal and the second filtered signal if errors were found in both the first filtered signal and the second filtered signal.

15. The post detection filtering system of claim 12, wherein the first post detection filter is optimized for sensitivity using a narrow filter having coefficients optimized for sensitivity and the second post detection filter is optimized for simulcast delay spread using a wide filter having coefficients optimized for simulcast delay spread.

16. A post detection filtering system for a selective call receiver optimized for both simulcast delay spread and receiver sensitivity, the post detection filtering system comprises:

a memory for storing a received signal;

a programmable post detection filter programmed for filtering the received signal optimized for sensitivity to provide a first filtered signal and further programmed for filtering the received signal optimized for simulcast delay spread to provide a second filtered signal; and a combiner for selectively combining the first filtered signal with the second filtered signal.

17. The post detection filtering system of claim 16, wherein the programmable post detection filter is optimized for sensitivity and optimized for simulcast delay spread by adjusting a set of coefficients in the programmable post detection filter.

18. A selective call receiver unit having a post detection filtering system optimized for both simulcast delay spread and receiver sensitivity, the selective call receiver unit comprising:

a receiver for receiving a transmitted signal and providing a received signal;

a detector for detecting a message from the received signal providing a detected signal;

a first post detection filter for filtering the detected signal and optimized for sensitivity providing a first filtered signal;

a second post detection filter for filtering the detected signal and optimized for simulcast delay spread providing a second filtered signal; and a combiner for selectively combining the first filtered signal with the second filtered signal.

19. The post detection filtering system of claim 18, wherein the combiner further comprises logic circuitry to determine if errors exist in both the first filtered signal and the second filtered signal.

20. The post detection filtering system of claim 19, wherein the combiner only combines the first filtered signal and the second filtered signal if errors were found in both the first filtered signal and the second filtered signal.

21. A selective call receiver having a programmable post detection filtering system optimized for both simulcast delay spread and receiver sensitivity, the post detection filtering system comprises:

a receiver for receiving a transmitted signal and providing a received signal;

a detector for detecting a message from the received signal providing a detected signal; and a programmable post detection filter selectively programmed to filter the detected signal optimized for sensitivity or to filter the detected signal optimized for simulcast delay spread.

22. The selective call receiver of claim 21, wherein the selective call receiver further comprises a received signal strength indicator to provide a measurement of received signal power, wherein the programmable post detection filter filters the detected signal optimized for simulcast delay spread if the measurement of received signal power is above a predetermined threshold and the programmable post detection filter filters the detected signal optimized for sensitivity if the measurement of the received signal power is below the predetermined threshold.

23. The post detection filtering system of claim 21, wherein the programmable post detection filter is optimized for sensitivity and optimized for simulcast delay spread by adjusting a set of coefficients in the programmable post detection filter.

24. The selective call receiver of claim 21, wherein the selective call receiver further comprises a memory for storing the detected signal and a combiner for selectively combining a first filtered signal provided when the programmable post detection filter is optimized for sensitivity with a second filtered signal provided when the programmable post detection filter is optimized for simulcast delay spread.

* * * * *